United States Patent
Lee et al.

(10) Patent No.: US 9,225,781 B2
(45) Date of Patent: Dec. 29, 2015

(54) APPARATUS AND METHOD FOR GENERATING VIRTUAL SENSOR IN SENSOR NETWORK

(71) Applicant: Electronics and Telecommunications Research Institute, Daejeon (KR)

(72) Inventors: Byung Bog Lee, Daejeon (KR); Jae Hak Yu, Chungcheongbuk-do (KR); Nae-soo Kim, Daejeon (KR); Cheol Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 196 days.

(21) Appl. No.: 13/937,741

(22) Filed: Jul. 9, 2013

(65) Prior Publication Data

US 2014/0013339 A1 Jan. 9, 2014

(30) Foreign Application Priority Data

Jul. 9, 2012 (KR) ........................ 10-2012-0074734

(51) Int. Cl.
*H04L 29/08* (2006.01)
*G06F 9/54* (2006.01)

(52) U.S. Cl.
CPC *H04L 67/12* (2013.01); *G06F 9/54* (2013.01); *H04L 67/2861* (2013.01)

(58) Field of Classification Search
None
See application file for complete search history.

(56) References Cited

U.S. PATENT DOCUMENTS

2007/0236346 A1* 10/2007 Helal et al. ............... 340/539.22
2012/0310558 A1* 12/2012 Taft ................................ 702/61

FOREIGN PATENT DOCUMENTS

KR 10-2011-0071456 A 6/2011

OTHER PUBLICATIONS

Nakamura, M.; Matsuo, S.; Matsumoto, S.; Sakamoto, H.; Igaki, H., "Application Framework for Efficient Development of Sensor as a Service for Home Network System" (Jul. 4-9, 2011), IEEE International Conference on Services Computing, pp. 576-583 [retrieved from http://ieeexplore.ieee.org/stamp/stamp.jsp?tp=&arnumber=6009309].*
Ibbotson, J.;Gibson, C.; Wright, J.; Waggett, P.; Zerfos, P.; Szymanski, B; Thornley, D.J., "Sensors as a Service Oriented Architecture: Middleware for Sensor Networks" (Jul. 19-21, 2010), Sixth International Conference on Intelligent Environments, pp. 206-214 [retrieved from http://ieeexplore.ieee.org/stamp/stamp.jsp?tp=&arnumber=5673819].*
Nakamura, M.; Tanaka, A.; Igaki, H.; Tamada, H.; Matsumoto, K., "Constructing Home Network Systems and Integrated Services Using Legacy Home Appliances and Web Serviecs" (Jan.-Mar. 2008), International Journal of WEb Services Research, pp. 81-97 [retrieved from http://ws.cs.kobe-u.ac.jp/achieve/data/pdf/279.pdf].*

(Continued)

*Primary Examiner* — Brian W Wathen
(74) *Attorney, Agent, or Firm* — Rabin & Berdo, P.C.

(57) ABSTRACT

A virtual sensor generation apparatus of a sensor network sets a communication connection to a sensor node at a periphery of a smart device, generates a logical sensor corresponding to a physical sensor that is connected to the sensor node, generates a virtual sensor with the logical sensor, and provides an application service to a user using the virtual sensor.

7 Claims, 6 Drawing Sheets

(56) References Cited

OTHER PUBLICATIONS

Nakamura, M.; Tanaka, A.; Igaki, H.; Tamada, H.; Matsumoto, K., "Implementing Integrated Services of Networked Home Appliances Using Service Oriented Architecture" (Nov. 15-19, 2004), Proceedings of the $2^{nd}$ international conference on service oriented computing, pp. 269-278 [retrieved from http://dl.acm.org/citation.cfm?id=1035206].*

Igaki, H.; Nakamura, M.; Matsumoto, K., "A service-oriented framework for networked appliances to achieve appliance interoperability and evolution in home network system" (Sep. 5-6, 2005), $8^{th}$ International Workshop on Principles of Software Evolution, pp. 61-64 [retrieved from http://ieeexplore.ieee.org/stamp/stamp.jsp?tp=&arnumber=1572309].*

Deugd et al., "SODA: Service-Oriented Device Architecture" (May 24, 2008), pp. 1-6 [retrieved from ftp://ftp.ihe.net/Patient_Care_Devices/Minutes-and-Meeting-Summaries-Yr4-2009-10/F2F-2009October5-9/SOA/SODA%20-%20Service-Oriented%20Device%20Architecture%20IEEE%20Pervasive%20Computing%202006%20vol5%20no3.pdf].*

Kim, M.; Lee, J.; Lee, Y.; Ryou, J., "COSMOS: A Middleware for Integrated Data Processing over Heterogeneous Sensor Networks" (Oct. 2008), ETRI Journal, vol. 30, No. 5, pp. 696-706 [retrieved from http://etrij.etri.re.kr/etrij/journal/article/article.do?volume=30&issue=&page=696].*

* cited by examiner

APPARATUS AND METHOD FOR GENERATING VIRTUAL SENSOR IN SENSOR NETWORK

CROSS-REFERENCE TO RELATED APPLICATION

This application claims priority to and the benefit of Korean Patent Application No. 10-2012-0074734 filed in the Korean Intellectual Property Office on Jul. 9, 2012, the entire contents of which are incorporated herein by reference.

BACKGROUND OF THE INVENTION (a) Field of the Invention

The present invention relates to an apparatus and method for generating a virtual sensor in a sensor network. More particularly, the present invention relates to an apparatus and method for generating a virtual sensor using a physical sensor and an actuator in a sensor network.

(b) Description of the Related Art

A sensor network system is generally formed with a sensor node communicating with a sensor/actuator, a personal area network (PAN) coordinator that manages the sensor node, and a gateway for forwarding actual data to a server through communication between the sensor nodes.

An existing sensor/actuator application service has been researched and developed for a web-based service with priority given to a server, a wide area sensor/actuator service, and a network search and connection service with priority given to a gateway.

Nowadays, a new individual service that uses various peripheral sensor/actuators through a smart phone, smart TV, smart household appliances, and a smart vehicle that are widely used in a daily life is requested.

SUMMARY OF THE INVENTION

The present invention has been made in an effort to provide an apparatus and method for generating a virtual sensor having advantages of being capable of using various peripheral sensors/actuators.

An exemplary embodiment of the present invention provides a virtual sensor generation apparatus in a sensor network. The virtual sensor generation apparatus includes a sensor node coordinator, a logic sensor manager, a virtual sensor manager, and a service manager. The sensor node coordinator sets a communication connection to a sensor node at a periphery of a smart device. The logic sensor manager generates at least one logical sensor corresponding to at least one physical sensor of a plurality of physical sensors of the sensor node. The virtual sensor manager generates a virtual sensor using the at least one logical sensor and at least one of previously generated virtual sensors. The service manager generates an application service using an application programming interface (API) of at least one of the logical sensor and the virtual sensor and that provides the application service to a user.

The virtual sensor generation apparatus may further include an identifier manager. The identifier manager may allocate a layer identifier representing a hierarchical location of the logical sensor and the virtual sensor to the logical sensor and the virtual sensor.

The layer identifier of the at least one logical sensor may be the same as a layer identifier of the at least one physical sensor, and the layer identifier of the virtual sensor may be distinguished from the layer identifier of the at least one logical sensor.

The sensor node coordinator may receive a profile of the sensor node and the plurality of physical sensors through the sensor node, and the logic sensor manager may set a profile of the at least one physical sensor to the at least one logical sensor.

Another embodiment of the present invention provides a method of generating a virtual sensor in a virtual sensor generation apparatus of a sensor network. The method includes: setting a communication connection to a sensor node at a periphery of a smart device; generating a plurality of logical sensors corresponding to a plurality of physical sensors, respectively, that are connected to the found sensor node; generating a virtual sensor using at least one logical sensor of the plurality of logical sensors; and generating an application service using the generated virtual sensors and providing the application service to the user.

The generating of a plurality of logical sensors may include allocating a layer identifier representing a hierarchical location of the plurality of logical sensors to the plurality of logical sensors, and the generating of a virtual sensor may include allocating a layer identifier representing a hierarchical location of the virtual sensor to the virtual sensor.

The generating of a plurality of logical sensors may include setting a profile of the plurality of physical sensors to the plurality of logical sensors.

The providing of the application service may include activating at least one physical sensor that is connected to the at least one logical sensor using an application programming interface (API) of the at least one logical sensor.

DETAILED DESCRIPTION OF THE EMBODIMENTS

Figure 1:
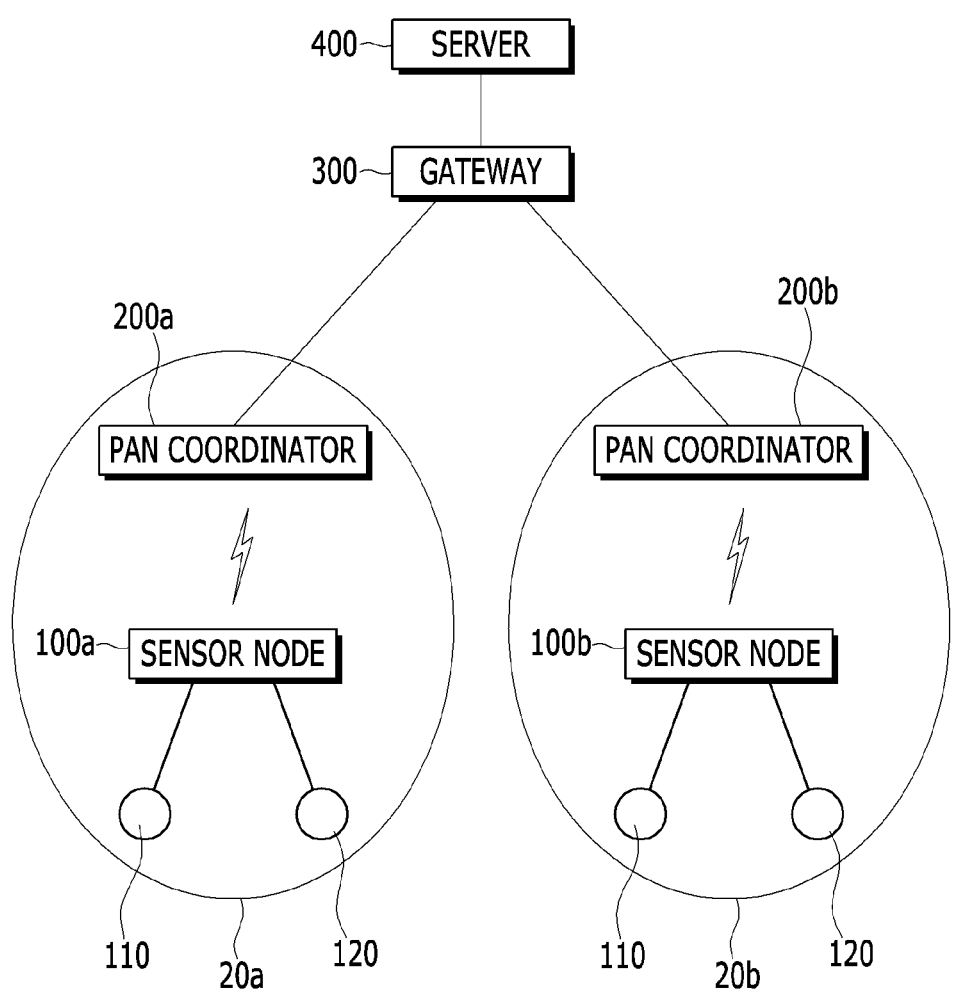
FIG. 1 is a diagram illustrating a sensor network environment according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, an apparatus and method for generating a virtual sensor of a sensor network according to an exemplary embodiment of the present invention will be described in detail with reference to the drawings.

FIG. 1 is a diagram illustrating a sensor network environment according to an exemplary embodiment of the present invention.

Referring to FIG. 1, the sensor network includes a plurality of sensor nodes 100a and 100b, PAN coordinators 200a and 200b, a gateway 300, and a server 400.

The gateway 300 and the server 400 are connected to an IP-based network, and the PAN coordinators 200a and 200b are mounted in the gateway 300.

The sensor nodes 100a and 100b may include at least one sensor 110 and/or actuator 120. The sensor 110 wirelessly senses environment information of temperature, light, and acceleration of a periphery and a material, for example, physical state information and recognition information of the actuator 120 according to a kind. The actuator 120 has a function of operating a predetermined apparatus or a function of turning power of a predetermined apparatus on/off.

The sensor nodes 100a and 100b forward data that is sensed by the sensor 110 to the PAN coordinators 200a and 200b, respectively, and control operation of the actuator 120. In this case, data of the sensor nodes 100a and 100b may be forwarded to the PAN coordinators 200a and 200b, respectively, through multi-hop.

The PAN coordinators 200a and 200b manage the sensor nodes 100a and 100b in network areas 20a and 20b thereof, and forward data received from the sensor nodes 100a and 100b in the network areas 20a and 20b thereof to the gateway 300.

The gateway 300 forwards sensing data received through the PAN coordinators 200a and 200b to the server 400. For a connection of the server 400 and the sensor nodes 100a and 100b, the gateway 300 supports a multimode-multichannel communication protocol.

The server 400 stores and manages sensing data received from the gateway 300.

Further, the server 400 registers profiles of an entire resource of a sensor network, for example, the sensor 110 and the actuator 120, the sensor nodes 100a and 100b, the PAN coordinators 200a and 200b, and the gateway 300, and manages the registered profiles.

The profile may include a resource management application programming interface (API) and additional information. The resource management API provides a function of initialization access to a resource, activation of a resource, setting an inactivation cycle, and resource monitoring. The additional information may include a local identifier and a layer identifier of a resource, a type of a resource, a unit of a resource, and a type of sensing data.

The sensor nodes 100a and 100b, the PAN coordinators 200a and 200b, and the gateway 300 store and manage profiles thereof. The sensor nodes 100a and 100b, the PAN coordinators 200a and 200b, and the gateway 300 store and manage profiles thereof at a non-volatile memory. The profiles of the sensor 110 and the actuator 120 are stored and managed at a non-volatile memory of the sensor nodes 100a and 100b in which the sensor 110 and the actuator 120 are mounted.

Figure 2:
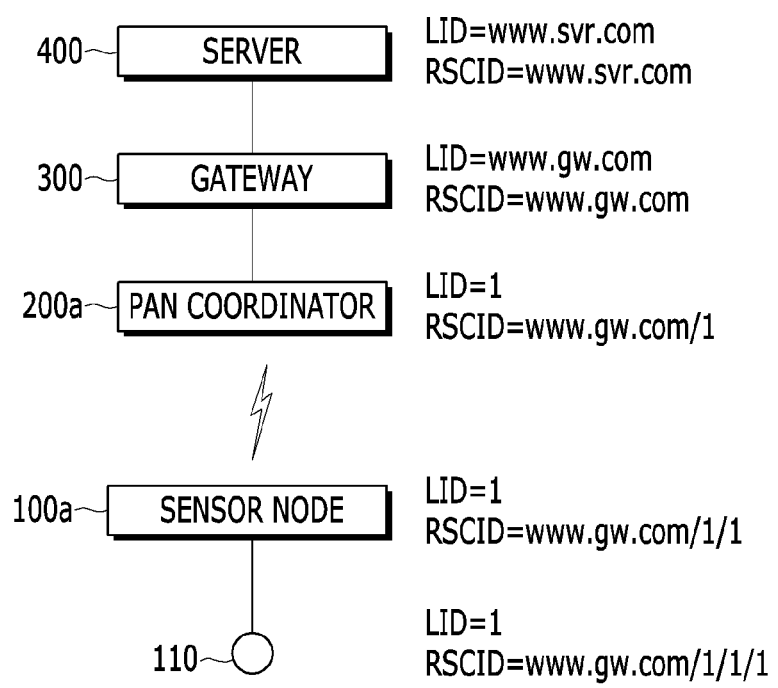
FIG. 2 is a diagram illustrating an example of an identifier hierarchical structure of a sensor network resource according to an exemplary embodiment of the present invention.

FIG. 2 is a diagram illustrating an example of an identifier hierarchical structure of a sensor network resource according to an exemplary embodiment of the present invention.

For convenience of a description, FIG. 2 illustrates one sensor node 100a, one sensor 110, and one actuator 120.

As shown in FIG. 2, the server 400, the gateway 300, the PAN coordinator 200a, the sensor node 100a, the sensor 110, and/or the actuator 120 have a local identifier (LID).

The LIDs of the server 400 and the gateway 300 are allocated according to an international mobile station identity (IMSI) or an Internet protocol (IP) address system, which is a number system of a mobile communication network.

The PAN coordinator 200a, the sensor node 100a, the sensor 110, and/or the actuator 120 may be allocated by a user or may be allocated according to a self-identification system that is defined in a sensor network such as ZigBee or Bluetooth, and a PAN.

Further, the gateway 300, the PAN coordinator 200a, the sensor node 100a, the sensor 110, and/or the actuator 120 have a hierarchical resource identifier (RSCID) representing location information about a resource.

That is, the sensor network is formed in a hierarchical structure of order of the gateway 300, the PAN coordinator 200a, the sensor node 100a, the sensor 110, and/or the actuator 120. Therefore, RSCIDs of the gateway 300, the PAN coordinator 200a, the sensor node 100a, the sensor 110, and/or the actuator 120 each represent hierarchical location information thereof.

Specifically, because the gateway 300 is an uppermost superordinate layer, an RSCID of the gateway 300 may be set to an LID of the gateway 300. Because the PAN coordinator 200a is located subordinate of the gateway 300, an RSCID of the PAN coordinator 200a may be set by combining an LID of the gateway 300 and an LID of the PAN coordinator 200a. In this way, an RSCID of the sensor node 100a may be set by combining an LID of the gateway 300, an LID of the PAN coordinator 200a, and an LID of the sensor node 100a. Further, an RSCID of the sensor 110 may be set by combining an LID of the gateway 300, an LID of the PAN coordinator 200a, an LID of the sensor node 100a, and an LID of the sensor 110, and an RSCID of the actuator 120 may be set by combining an LID of the gateway 300, an LID of the PAN coordinator 200a, an LID of the sensor node 100a, and an LID of the actuator 120.

For example, as shown in FIG. 2, when an LID of the gateway 300 is www.gw.com, an LID of the PAN coordinator 200a is 1, an LID of the sensor node 100a is 1, and an LID of the sensor 110 is 1, an RSCID of the gateway 300 may be set to www.gw.com, an RSCID of the PAN coordinator 200a may be set to www.gw.com/1, an RSCID of the sensor node 100a may be set to www.gw.com/1/1, and an RSCID of the sensor 110 may be set to www.gw.com/1/1/1.

Figure 3:
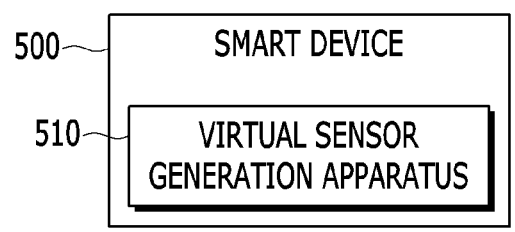
FIG. 3 is a block diagram illustrating a virtual sensor generation apparatus of a smart device according to an exemplary embodiment of the present invention.

FIG. 3 is a block diagram illustrating a virtual sensor generation apparatus of a smart device according to an exemplary embodiment of the present invention.

Referring to FIG. 3, a smart device 500 includes a virtual sensor generation apparatus 510.

The smart device 500 may be a user terminal of a smart phone, a smart TV, a smart household appliance, and a smart vehicle.

The virtual sensor generation apparatus 510 connects peripheral sensor nodes of the smart device 500 to generate a logic sensor and/or actuator corresponding to a sensor and/or an actuator of the sensor node, and generates a virtual sensor and/or a virtual actuator using the logic sensor and/or actuator. The smart device 500 provides an application service to the user using the generated virtual sensor and/or actuator.

That is, the virtual sensor generation apparatus 510 may generate a new virtual sensor and/or virtual actuator through cooperation with a physical sensor and/or actuator of a peripheral sensor node of the smart device 500, and may provide a new application service to the user using the virtual sensor and/or the virtual actuator.

Figure 4:
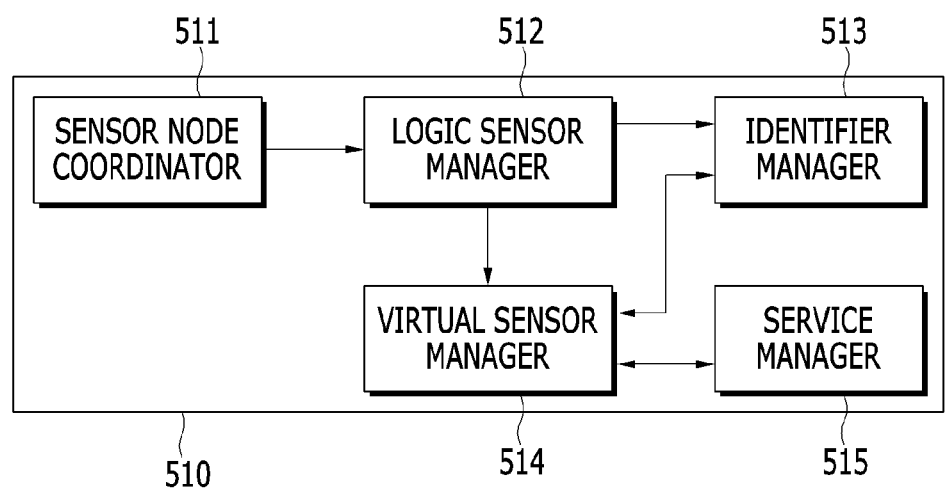
FIG. 4 is a block diagram illustrating the virtual sensor generation apparatus of FIG. 3.

FIG. 4 is a block diagram illustrating the virtual sensor generation apparatus of FIG. 3.

Referring to FIG. 4, the virtual sensor generation apparatus 510 includes a sensor node coordinator 511, a logic sensor manager 512, an identifier manager 513, a virtual sensor manager 514, and a service manager 515.

The sensor node coordinator 511 performs the same function as the PAN coordinators 200a and 200b that are described in FIG. 1.

When the smart device 500 enters, for example, the network area 20a of the PAN coordinator 200a, the sensor node coordinator 511 searches for the sensor node 100a of the network area 20a and sets a communication connection to the found sensor node 100a. For connection to various sensor nodes, the sensor node coordinator 511 supports a multi-mode-multichannel communication protocol.

The logic sensor manager 512 generates a logical sensor and/or an actuator to correspond to the physical sensor 110 and/or the actuator 120 of the sensor node 100a in which a connection is set, and sets and gives profiles of the physical sensor 110 and/or the actuator 120 to a corresponding logical sensor and actuator, respectively. The logic sensor manager 512 connects and sets a logical sensor and/or an actuator corresponding to the physical sensor 110 and/or the actuator 120.

The identifier manager 513 allocates an RSCID to the logical sensor and/or the logical actuator. Further, the identifier manager 513 allocates an RSCID to a virtual sensor and a virtual actuator.

The virtual sensor manager 514 generates a new virtual sensor by combining at least one of logical sensors or random virtual sensors and generates a new virtual actuator by combining at least one of logical actuators or random virtual actuators. Such a generated virtual sensor has a characteristic of a physical actuator that is related to virtual sensor generation, and the generated virtual actuator also has a characteristic of a physical actuator that is related to virtual actuator generation.

The service manager 515 generates an application service using an API of at least one of a logical sensor, a logical actuator, a virtual sensor, and a virtual actuator, and manages the generated application service.

Figure 5:
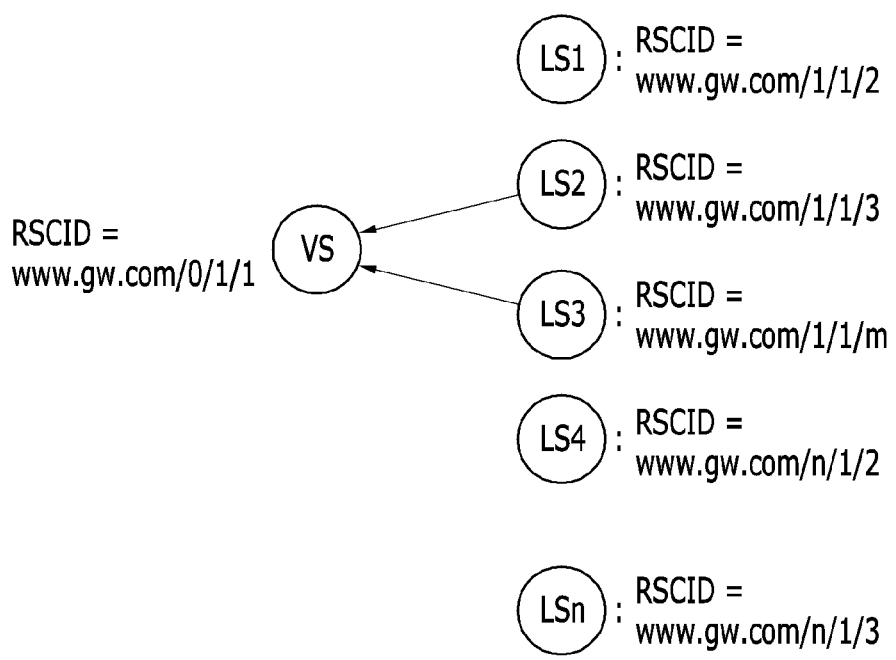
FIG. 5 is a diagram illustrating an example of a method of allocating a layer identifier in an identifier manager of FIG. 4.

FIG. 5 is a diagram illustrating an example of a method of allocating a layer identifier in an identifier manager of FIG. 4.

Referring to FIG. 5, a virtual sensor VS is generated by combining at least one of a plurality of logical sensors LS1-LS5. For example, as shown in FIG. 5, a new virtual sensor VS may be generated by combining logical sensors LS2 and LS4.

The identifier manager 513 allocates an RSCID to a plurality of logical sensors LS1-LS5 and the virtual sensor VS.

The identifier manager 513 allocates an RSCID of the logical sensors LS1-LS5 with the same value as that of an RSCID of a physical sensor that is connected to each of the logical sensors LS1-LS5. Further, the identifier manager 513 may allocate an RSCID of the virtual sensor VS with a different value from that of an RSCID of a physical sensor and logical sensors LS1-LS5, and allocate an RSCID of the virtual sensor VS to know a hierarchical location of the virtual sensor VS. Such an RSCID may be used for identifying the virtual sensor VS.

For example, when an RSCID of each of logical sensors LS1-LSn has a value of FIG. 4, the RSCID of the virtual sensor VS may be set to www.gw.com/0/1/1. The virtual sensor VS may follow an identifier hierarchical structure that is shown in FIG. 2. "0" representing an immediate subordinate of www.gw.com is an LID of a PAN coordinator, and may be set as a value representing the virtual sensor VS. A value of an immediate subordinate of 0 indicates an LID of the sensor node, and a lowermost subordinate value indicates an LID of the sensor.

Figure 6:
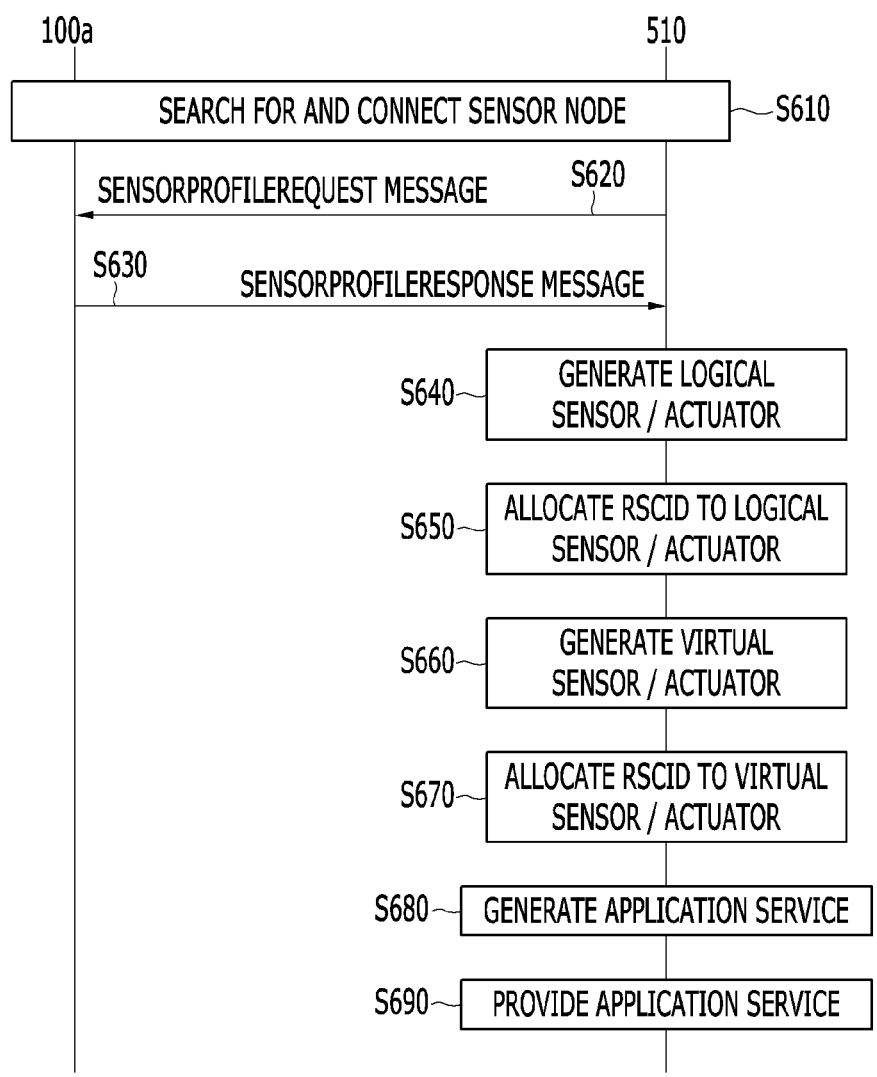
FIG. 6 is a flowchart illustrating a method of generating a virtual sensor of a virtual sensor generation apparatus according to an exemplary embodiment of the present invention.

FIG. 6 is a flowchart illustrating a method of generating a virtual sensor of a virtual sensor generation apparatus according to an exemplary embodiment of the present invention.

Referring to FIG. 6, when the smart device 500 enters, for example, the network area 20a of the PAN coordinator 200a, in order to search for a physical sensor/actuator resource, the sensor node coordinator 511 of the virtual sensor generation apparatus 510 searches for the physical sensor node 100a at a periphery of the smart device 500 using a multimode and a multichannel, and sets a connection to the found sensor node 100a (S610).

The sensor node coordinator 511 requests the profile of a sensor node 100a and the sensor 110/actuator 120 that is mounted in the sensor node 100a from the sensor node 100a through a SensorProfileRequest message (S620), and receives a profile of the sensor node 100a and the sensor 110/actuator 120 of the sensor node 100a through a SensorProfileResponse message from the sensor node 100a (S630). In this case, the sensor node coordinator 511 may receive a profile of the sensor node 100a and the sensor 110/actuator 120 through a beacon message that the sensor node 100a periodically broadcasts.

The logic sensor manager 512 of the virtual sensor generation apparatus 510 generates a logical sensor/actuator corresponding to the physical sensor 110/actuator 120 based on the profile of the sensor node 100a and the sensor 110/actuator 120 (S640).

The identifier manager 513 allocates an RSCID to the generated logical sensor/actuator (S650).

The virtual sensor manager 514 generates a virtual sensor/actuator using a logical sensor/actuator and/or a random virtual sensor/actuator (S660).

When the virtual sensor/actuator is generated, the identifier manager 513 allocates an RSCID to the generated virtual sensor/actuator (S670).

The service manager 515 generates an application service using an API of a logical sensor/actuator and/or a virtual sensor/actuator (S680), and provides the application service to the user (S690).

For example, when a temperature sensor, a humidity sensor, and an atmospheric pressure sensor exist at the network area 20a, the virtual sensor generation apparatus 510 of the smart device 500 generates a logical temperature sensor, a logical humidity sensor, and a logical atmospheric pressure sensor from the temperature sensor, the humidity sensor, and the atmospheric pressure sensor, respectively corresponding to a physical sensor that is mounted at the physical sensor node, and generates a virtual arthritis sensor with a combination of logical sensors (a temperature sensor, a humidity sensor, and an atmospheric pressure sensor).

Thereafter, when wanting to acquire an arthritis sensing value in a 10 minute cycle, a sensing data collection cycle parameter is forwarded to a virtual arthritis sensor, and the virtual arthritis sensor calls each of data collection APIs of a logical sensor and activates a corresponding physical sensor. Thereafter, the logical sensors forward a collected result of sensing data of the corresponding physical sensor to the virtual arthritis sensor, and the virtual arthritis sensor visualizes the received sensing data to an application service user through a user interface.

Thereby, the smart device 500 can freely use a sensor/actuator that is installed at a periphery like a sensor/actuator that is mounted in the smart device 500 as needed, and can thus provide various USN services.

According to an exemplary embodiment of the present invention, by generating a virtual sensor using a physical sensor and actuator of a sensor node that is installed at an area in which a smart device visits, a sensor and an actuator that are installed at the visit area can be personally used like a sensor and an actuator that are mounted in the smart device. Thereby, various ubiquitous sensor network (USN) services can be generated and activated through a peripheral sensor/actuator.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A virtual sensor generation apparatus of a smart device, comprising:
    a sensor node coordinator that sets a communication connection from the smart device to a sensor node at a periphery of the smart device upon the smart device entering a sensor network area, and receives, from the sensor node via the communication connection, a plurality of profiles, each profile being that of the sensor node or that of one of a plurality of physical sensors connected to the sensor node;
    a logic sensor manager that generates at least one logical sensor corresponding to at least one of the plurality of physical sensors of the sensor node, and assigns the profile of the at least one physical sensor to the at least one logical sensor;
    a virtual sensor manager that generates a virtual sensor using the at least one logical sensor and at least one of previously generated virtual sensors; and
    a service manager that generates an application service using an application programming interface (API) of the at least logical sensor and the at least one virtual sensor and that provides the application service to a user.

2. The virtual sensor generation apparatus of claim 1, further comprising an identifier manager that allocates, to each of the at least one logical sensor and the at least one virtual sensor, a layer identifier representing a hierarchical location of said each logical sensor or virtual sensor.

3. The virtual sensor generation apparatus of claim 2, wherein
    the layer identifier of the at least one logical sensor is the same as a layer identifier of the at least one physical sensor, and
    the layer identifier of the virtual sensor is distinguished from the layer identifier of the at least one logical sensor.

4. A method of generating a virtual sensor by a smart device, the method comprising:
    upon entering a sensor network area, searching, by the smart device, for a sensor node at a periphery of the smart device in the sensor network area, and setting a communication connection from the smart device to the sensor node;
    receiving, by the smart device from the sensor node via the communication connection, a plurality of profiles, each profile being that of the sensor node or that of one of a plurality of physical sensors connected to the sensor node;
    generating, by the smart device, a plurality of logical sensors respectively corresponding to the plurality of physical sensors, and assigning the profile of each physical sensor to one of the logical sensors corresponding to said each physical sensor;
    generating, by the smart device, a virtual sensor using at least one logical sensor of the plurality of logical sensors; and
    generating, by the smart device, an application service using the generated virtual sensor, and providing, by the smart device, the application service to a user.

5. The method of claim 4, wherein
    the generating a plurality of logical sensors comprises allocating, to each of the plurality of logical sensors, a layer identifier representing a hierarchical location of said each logical sensor, and
    the generating a virtual sensor comprises allocating a layer identifier representing a hierarchical location of the virtual sensor to the virtual sensor.

6. The method of claim 5, wherein
    the layer identifier of said each logical sensor is the same as a layer identifier of a corresponding physical sensor, and
    the layer identifier of the virtual sensor is distinguished from the layer identifiers of the plurality of logical sensors.

7. The method of claim 4, wherein the providing the application service comprises activating at least one physical sensor that is connected to the at least one logical sensor using an application programming interface (API) of the at least one logical sensor.

* * * * *